United States Patent [19]

Claassen

[11] Patent Number: 4,898,527
[45] Date of Patent: Feb. 6, 1990

[54] APPARATUS FOR LIQUEFYING A THERMOPLASTIC HIGH POLYMER MATERIAL

[76] Inventor: Henning J. Claassen, Industriegebiet Hafen, 2120 Lüneburg, Bundesrepublik Deutschland, Fed. Rep. of Germany

[21] Appl. No.: 265,438

[22] Filed: Nov. 1, 1988

[30] Foreign Application Priority Data

Nov. 10, 1987 [DE] Fed. Rep. of Germany ....... 3738191

[51] Int. Cl.⁴ .............................................. B29C 47/92
[52] U.S. Cl. ...................................... 425/143; 222/53; 222/54; 222/56; 264/40.1; 264/40.6; 425/145
[58] Field of Search ............... 425/143, 144, 145, 135, 425/141; 264/40.3, 40.1, 40.6; 222/52, 54, 56, 59, 63, 50

[56] References Cited

U.S. PATENT DOCUMENTS

| | | | |
|---|---|---|---|
| 3,733,059 | 5/1973 | Pettit | 366/79 |
| 3,797,808 | 3/1974 | Ma et al. | 259/191 |
| 4,308,447 | 12/1981 | Notzold et al. | 219/421 |
| 4,328,549 | 5/1982 | Avery | 364/469 |
| 4,437,581 | 3/1984 | Coker | 222/54 |
| 4,458,827 | 7/1984 | Steete | 222/1 |
| 4,598,842 | 7/1986 | Sticher et al. | 222/146.5 |
| 4,600,124 | 7/1986 | Price | 222/54 |
| 4,667,852 | 5/1987 | Siemann | 222/54 |
| 4,671,908 | 6/1987 | Gwinn et al. | 264/40.7 |
| 4,682,710 | 6/1987 | Turner, Jr. et al. | 222/63 |
| 4,724,983 | 2/1988 | Claassen | 222/146.5 |

FOREIGN PATENT DOCUMENTS 2836545  3/1980  Fed. Rep. of Germany .
3600020  2/1987  Fed. Rep. of Germany .

Primary Examiner—Jay H. Woo
Assistant Examiner—K. P. Nguyen
Attorney, Agent, or Firm—Armstrong, Nikaido, Marmelstein, Kubovcik & Murray

[57] ABSTRACT

An apparatus for liquefying a thermoplastic, high-polymer material has a supply container for the thermoplastic material, heating means for heating the material in the supply container, a base part disposed beneath the supply container and containing a collecting trough for the liquefied thermoplastic material and control means regulating the heating means in dependence upon a comparison between a predetermined desired value and an actual value detected by a sensor. In order to be able to follow even rapid changes of the operating conditions the amount of liquefied thermoplastic material conveyed out of the collecting trough is detected as actual value and supplied to the control means; a suitable measure of this amount is in particular the speed of rotation of a pump serving as conveying means to convey the liquefied material from the collecting trough.

5 Claims, 2 Drawing Sheets

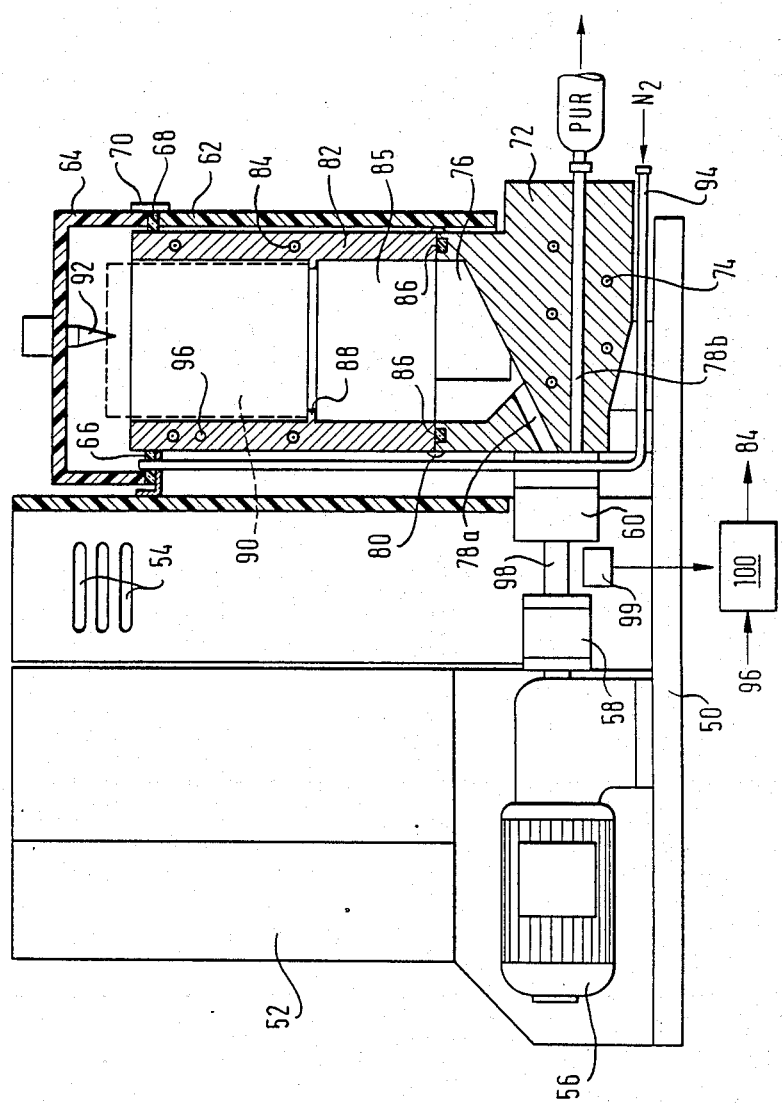

APPARATUS FOR LIQUEFYING A THERMOPLASTIC HIGH POLYMER MATERIAL

BACKGROUND OF THE INVENTION

1. Field of the Invention

The invention relates to an apparatus for liquefying a thermoplastic high-polymer material comprising a supply container for the thermoplastic material, heating means for heating the thermoplastic material in the supply container, a base part arranged beneath the supply container and containing a collecting trough for the liquefied thermoplastic material, and control means for regulating the heating means for the supply container in dependence upon the result of a comparison between a given desired value and an actual value detected by a sensor.

2. Description of the Prior Art

Such a liquefying apparatus is known, for example, from German patent specification 2,836,545 (corresponding to U.S. Pat. No. 4,308,447) or 3,600,020 (corresponding to U.S. Pat. No. 4,724,983) and comprises a supply container for the thermoplastic high-polymer material, heating means for heating the thermoplastic material in the supply container and a collecting trough for the liquefied material arranged beneath the supply container, said material being supplied from said trough to further processing, for example an applicator. In the supply container, which can also be referred to as "premelt zone", a relatively exactly defined temperature of the high-polymer material must be maintained to avoid unfavorable influences on the further processing; said premelt temperature is as a rule about 20 to 30% below the final temperature of the liquefied thermoplastic material in the collecting trough.

To maintain this temperature in the premelt zone, which is essential for the further processing, temperature sensors are provided either in the walls or in the bottom of the premelt zone detecting the actual temperature in this region and then supplying said temperature to a control means comparing the actual value of said temperature with a predetermined desired value, so that a corresponding adjustment of the heat supply to the premelt zone can be made.

It has, however, been found that such a temperature control cannot follow rapidly enough the fluctuations of the operating conditions occurring so that, as a rule, excessive deviations from the predetermined desired values arise.

As an alternative, attempts have already been made to provide a temperature sensor in the liquefied mass in the premelt zone, for example beneath the bottom of the supply container, said sensor detecting directly the temperature of the mass of the thermoplastic high-polymer material. However, once again delays in the response of the temperature detection occur which are due essentially to the poor thermal conductivity of the thermoplastic high-polymer materials and the resulting very inhomogeneous temperature distribution.

SUMMARY OF THE INVENTION

The invention is thus based on the problem of providing an apparatus for liquefying thermoplastic high-polymer materials in which the above disadvantages are avoided. In particular, a liquefying apparatus is provided which permits a very exact, practically delay-free adjustment of the temperature in the premelt zone to a predetermined desired value, even with great fluctuations in the operating conditions.

To achieve this object, the invention proposes in an apparatus for liquefying a thermoplastic high-polymer material comprising a supply container for the thermoplastic material, heating means for heating the thermoplastic material in the supply container, a base part arranged beneath the supply container and containing a collecting trough for the liquefied thermoplastic material, and control means for controlling the heating means for the supply container relative to the result of a comparison between a predetermined desired value and an actual value detected by a sensor, the improvement comprising that the sensor detects the amount of liquefied thermoplastic high-polymer material conveyed out of the collecting trough and supplies to the control means a corresponding signal as actual value.

Expedient embodiments are defined by the features of the subsidiary claims.

The advantages achieved with the invention are based on the following considerations:

As has been indicated above, thermoplastic high-polymer materials are extremely poor thermal conductors, whilst the metal walls of the premelt zone in which both the temperature sensors and the heating elements of the heating means are generally disposed are very good thermal conductors. This results, however, in a poor heat transfer both from the heating elements to the molten thermoplastic mass and from the mass to the temperature sensors so that in particular on fluctuations of the operating conditions a very irregular temperature distribution occurs in the molten mass in the premelt zone.

Particularly grave changes of the operating conditions are fluctuations in the velocity with which the liquefied high-polymer thermoplastic material is transported out of the collecting trough and supplied to the processing station. On such changes, in particular on starting up from the readiness state to full performance capacity, temperature changes occur in the molten mass which cannot be detected with the conventional temperature sensors and consequently cannot be taken into account in the regulation of the heating elements.

The invention now proposes to avoid these problems by using as actual control value the parameter which is in fact decisive, that is the amount of the liquefied thermoplastic material conveyed out of the collecting trough, i.e. the temperature-dependent control usual hitherto is replaced by a quantity-dependent control. Thus, with small amounts to be applied a relatively low heating power is used whilst when the amount to be applied is increased to the maximum value the full heating power s adjusted, this does not however, involve any problem because then also the premolten mass can be discharged just as rapidly from the supply container, i.e. an excessive and thus disadvantageous heating of the thermoplastic mass cannot occur in the premelt container.

Various methods are available for the detection of the amount of liquefied thermoplastic high-polymer material discharged from the collecting trough, for example the use of an additional flow meter in the discharge conduit of the liquefying apparatus. According to a preferred embodiment, however, the discharged amount is measured indirectly and detected from the speed of rotation of the pump serving to convey the liquefied thermoplastic material from the collecting trough.

The speed can be mechanically, optically or electrically detected and a corresponding signal supplied to the control means which compares this actual value with the predetermined desired value and regulates the heating elements of the heating means accordingly.

As mentioned, the liquefying apparatuses hitherto available commercially are provided with temperature sensors in the premelt zone; these liquefying apparatuses can still be used in future and additionally provided according to the invention with a speed sensor which supplies the actual value of the speed of the pump to the corresponding adapted control means as a measure for the discharge amount of the liquefied thermoplastic material.

The temperature sensors, which are usually installed stationarily, can also be further used; they can be employed as limit switches which when a predetermined maximum temperature is exceeded respond and then switch off the heat supply. These temperature sensors do not, of course, perform any function in the temperature control of the premelt zone.

These temperature sensors can be arranged either in the walls and in the bottom of the premelt zone or in the molten mass itself.

BRIEF DESCRIPTION OF THE DRAWINGS

The invention will be explained hereinafter in detail with the aid of examples of embodiments with reference to the enclosed schematic drawings, wherein.

DESCRIPTION OF THE PREFERRED EMBODIMENTS

Figure 1:
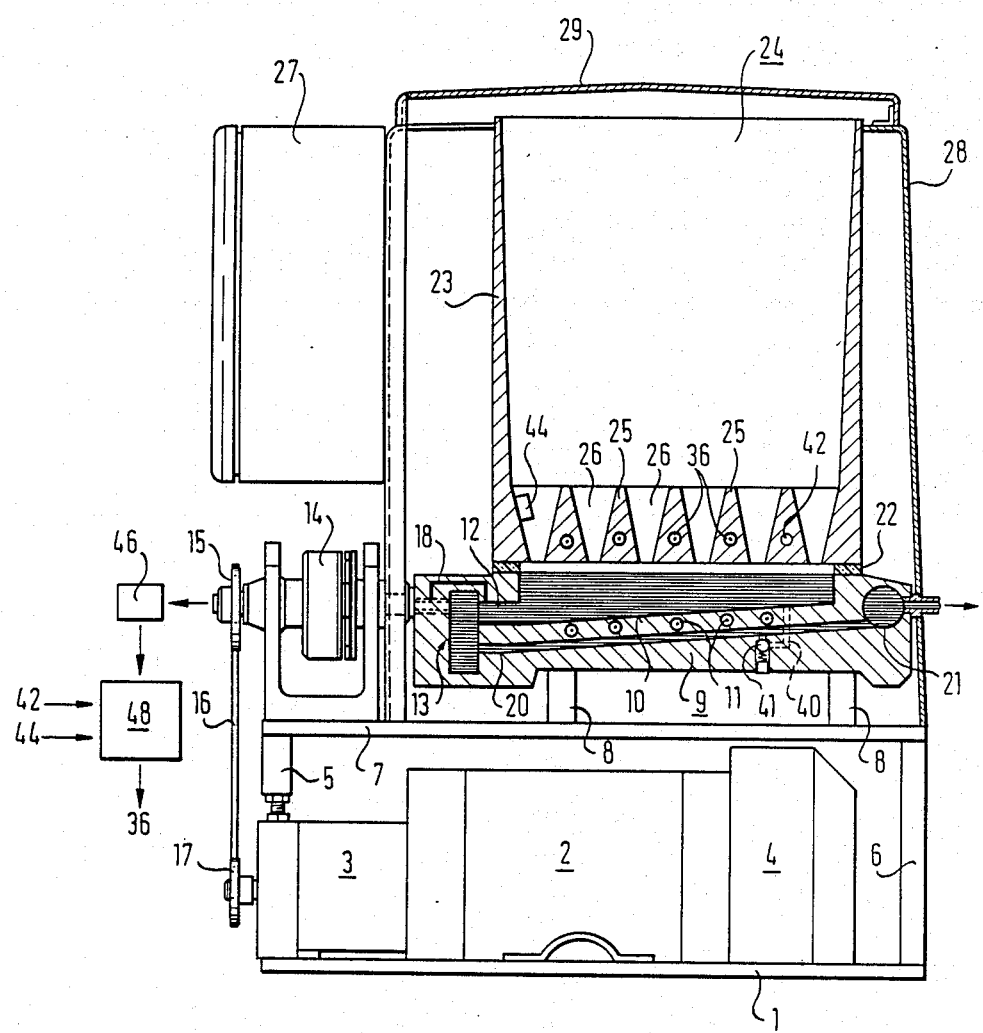
FIG. 1 shows a vertical center section through an apparatus for liquefying a hot-melt adhesive in the plane of symmetry thereof and FIG. 2 s a vertical section through an apparatus for liquefying an adhesive on the basis of polyurethane.

The apparatus shown in FIG. 1 for liquefying a hot-melt adhesive has the basic construction known from German patent specification 2,836,545 and comprises on a base plate in an electric drive motor 2 which down-connected or after-connected from a reduction gearing 3. On the other side of the electric motor 2 there is an electric control cabinet 4.

An upper support plate 7 is held on the base plate 1 by legs 5 and 6; said plate 7 carries by means of supports 8 a flat collecting trough 9 consisting of a light-metal casted body. The collecting trough 9 collects in its recess 10 the hot-melt adhesive which is heated to the temperature of application and which is shown as black in FIG. 1. Beneath the recess 10 there are electrical resistance heating rods 11 in respective bores which serve to heat the content of the collecting trough to the desired adjustable final temperature. For this purpose a temperature sensor is provided in the vicinity of the bottom of the collecting trough 9 which keeps the temperature in the collecting trough 9 constant in the usual manner via a thermostat.

From the collecting trough 9 a conduit 12 leads to a geartype pump 13 which is indicated only schematically and which is driven via a magnetic coupling 14, a pulley 15, a belt 16 and a further pulley 17 mounted on the output shaft of the gearing 3. A return conduit 18 for the liquid hot-melt adhesive leaking through the bearings of the wheels of the gear-type pump 13 is likewise indicated in the drawing.

From the gear-type pump 13 a conduit 20 also held by electrical heating rods 11 at the necessary temperature leads to a sleeve or screen 21 preventing the discharge of undesired solid particles with the liquefied hot-melt adhesive. Down stream from the screen 21 there is a conventional connecting fixture not shown, for a likewise heatable conduit which can be kept at constant temperature and leads to the actual applicator.

On the edge of the collecting trough 9 there is a thermal insulation layer 22, as a rule an asbestos layer compacted with plastic, which is thick enough to prevent an inadmissibly high heat flow from the trough 9, which is at relatively high temperature, to the side wall 23 of the supply container 24 placed thereabove and having a square cross-section in the horizontal plane. The perforated bottom 25 of the supply container 24 is cast integrally with the side wall 23 of the supply container 24. The perforated bottom 25 has downwardly tapering perforations 26 through which the premolten hot-melt adhesive flows downwardly into the collecting trough 9 which forms the main melting zone. The temperature of the collecting trough 9 is, as a rule, about 20 to 30% higher than the temperature in the region of the perforated bottom 25 forming the premelt zone and in the adjoining region of the supply container 24.

The supply container 24 is surrounded in spaced relationship by a thermal insulation jacket 28 and sealed at the top by means of a cover 29. For introducing the generally granulate, cold hot-melt adhesive the cover is raised or pivoted. Mounted on the jacket 28 is a control cabinet 27 which accommodates the electrical circuit elements for the control of the temperature in the various heating elements of this apparatus.

The perforated bottom 25 is formed by intersection ribs 25 (see FIG. 1) in which bores are disposed for heating elements 36, generally electrical resistance heaters insulated by means of chamotte tubes.

Between the conduit 20 and the recess 10 of the collecting trough 9 a short-circuiting conduit 40 is provided which is protected by a check valve 41.

In FIG. 1 means are also schematically indicated with which the temperature in the premelt zone, i.e. substantially at the level of the perforated bottom 25, can be kept at a predetermined desired value; these means are a first temperature sensor 42 which is disposed in a bore in a rib of the perforated bottom 25, a second temperature sensor 44 which is disposed directly in the heated and thus liquefied thermoplastic mass in the region of the perforated bottom 25, a third sensor 46 for detecting the speed of the pump 13 and the actual control means 48 which receives the corresponding actual values from the sensors 42, 44 and 46 and generates therefrom a control signal for the heating elements 36, as indicated in FIG. 1.

FIG. 1 is intended to represent only schematically the two basic possibilities for detecting the temperature in the premelt zone, that is firstly in the perforated bottom 25, as illustrated in FIG. 1, or in a side wall, and secondly in the molten mass itself, namely by the sensor 44. However, for most purposes it will no doubt suffice to provide only one of the two temperature sensors 42 or 44.

FIG. 1 indicates the detection of the speed of the pump 13 by means of the sensor 46 at the pulley 15, the speed of which can be measured, for example, electro-optically, i.e. by means of a light barrier having a beam which is interrupted by the perforated pulley 15.

Other speed sensors can also be employed; finally, it is also possible to detect the speed of the pump 13 at a different point, for example at the pulley 17, the belt 16, the magnetic coupling or directly at the pump 13.

The temperature control itself is effected only by means of the sensor 46 which determines the actual value for the speed of the pump 13 (or a corresponding value dependent thereon) and supplies this actual value to the control means 48 where said actual value is compared with a desired value and the heat supply to the heating elements 36 is controlled accordingly.

The signals of the temperature sensors 42 and 44 serve only to adjust an upper limit value for the temperature, i.e. if for any reasons the temperature of the molten mass in the region of the perforated bottom 25 rises above an admissible maximum value, the corresponding signals of the temperature sensors 42 and 44 override the control means 48 so that as a rule the heating elements 36 are switched off and thus the heat supply to the premelt zone is interrupted.

This amount-dependent temperature control is suitable not only for the stationary, steady state but responds also to changes of the operating conditions, in particular with a pronounced increase or reduction of the discharge amount from the collecting trough 9; and in particular with a great increase of the discharge amount to the maximum value the full heating power is adopted to ensure that the temperature in the region of the perforated bottom 25 remains at the predetermined desired value.

FIG. 2 shows the basic construction of an apparatus known from German patent specification 3,600,020 for liquefying adhesives on the basis of polyurethane.

Said liquefying apparatus comprises a base plate 50 which carries a control cabinet 52 accommodating the electrical circuit elements for the control of the temperature at the various heating elements and provided with ventilation slits 54, an electric motor 56 and the actual liquefying part on the right side according to the illustration in FIG. 2. Via a coupling, in particular a magnetic coupling, or a gearing, generally a reduction gearing, as indicated by the reference numeral 58, the electric motor 56 drives a gear-type pump 60 for conveying the heated and thus liquefied polyurethaneadhesive.

The actual liquefying part is disposed in a thermal protection hood 62 which also shields the sensitive electronic components of the control cabinet 52 and is sealed at its upper end by a pivotally mounted cover 64. For sealing the gap between the cover 64 and the lower region of the liquefying part seals 66 and 68 are provided. In addition, a schematically indicated lock mechanism 70 is provided which holds the cover 64 in its operating position shown in FIG. 2.

The actual liquefying part comprises a block-shaped foundation 72 having heating bores in which heating elements 74 are disposed, that is, electrical resistance heating elements insulated by means of chamotte tubes.

At its upper end the block 72 contains a recess 76 which is shaped as collecting trough and is connected via a passage 78a to the gear-type pump 60. A further portion 78b of the conveying passage extends from the gear-type pump 60 to the outlet for the liquefied adhesive which is indicated by "PUR", the abbreviation for polyurethane.

The actual supply container 82 is detachable mounted on the block 72 by clamps 80; its walls are likewise provided with heating bores in which heating elements 84 are disposed, for example electrical resistance heating elements insulated by chamotte tubes.

Between the upper edge of the walls of the block 72 in the region of the recess 76 and the lower edge of the walls of the supply container 82 seals 86 are provided, in particular insulations on the basis of mineral fibers, conveniently asbestos.

As apparent from FIG. 2, the two upper seals 64, 68 bear on the outer wall of the upwardly open supply container 82.

The supply container 82 comprises two parts, that is a lower buffer volume 84 and an upper part which is separated from the lower part 86 by a narrow encircling shoulder 88 projecting inwardly from the inner wall thereof. The lower edge of a downwardly open transport container 90 for the polyurethane adhesive rests on said shoulder 88, as indicated in FIG. 2 in dashed lines.

The inner edge of the cover 64 is provided with a downwardly projecting pointed mandrel 92, the tip of which penetrates into the upwardly open bottom surface of the transport container 90.

A conduit for an inert gas, in particular nitrogen, runs through beneath the block 72, then laterally past the supply container 82 upwardly and opens into the cavity formed between the upper end of the transport container 90 and the cover 64.

In one of the bores in the wall of the supply container 82 a temperature sensor 96 is disposed. Alternatively or additionally a further sensor can be provided for the temperature of the heated thermoplastic mass (not shown).

Provided on the shaft 98 between the coupling or the gearing 58 and the gear-type pump 60 is a sensor 99 which detects the speed or rotation of the shaft 98 and furnishes a corresponding signal as actual value to a control means 100 which also receives the output signal of the temperature sensor 96.

The sensor 99 can respond mechanically, electrically or optically to the rotation of the shaft 98.

In normal operation the actual value for the speed of the shaft 98 as detected by the sensor 99 is compared in the control means 100 with the predetermined desired value and from this comparison, a control signal for the heating elements 84 of the supply container 82 is recovered.

When a predetermined temperature in the molten mass is exceeded and this temperature excess is detected by the temperature sensor 96, the control means 100 is overriden and as a rule, the heat supply is switched off to prevent excessive heating of the sensitive polyurethane.

While the invention has been particularly shown and described in reference to preferred embodiments thereof, it will be understood by those skilled in the art that changes in form and details may be made therein without departing from the spirit and scope of the invention.

I claim:

1. An apparatus for liquefying a thermoplastic high-polymer material, comprising:
    (a) a supply container for the thermoplastic material;
    (b) heating means for heating the thermoplastic material in the supply container;
    (c) a base part arranged beneath the supply container and containing a collecting trough for the liquefied thermoplastic material;
    (d) a sensor means for detecting the amount of liquefied thermoplastic high-polymer material conveyed out of the collecting trough and for supplying a corresponding signal as an actual value; and (e) control means for controlling the heating means for the supply container relative to a result of a comparison between a given desired value of the amount of liquefied thermoplastic high-polymer material conveyed out of the collecting trough and an actual value detected by the sensor means.

2. An apparatus according to claim 1, further comprising a pump means for conveying of the liquefied thermoplastic material from the collecting trough, wherein the sensor means detects the speed of rotation of the pump.

3. An apparatus according to claim 2, wherein the sensor means detects the speed of rotation of at least one of a pulley and a shaft.

4. An apparatus according to claim 2, wherein the sensor detects the speed of rotation electrically, in particular inductively, mechanically or electrooptically.

5. An apparatus according to claim 1, further comprising another sensor means for the temperature of at least one of a wall of the supply container and a mass of the premolten thermoplastic material in the supply container, wherein the output signals of the temperature sensor means are supplied to the control means for limiting the temperature value to a maximum value.

* * * * *